United States Patent [19]

Schopper

[11] 4,351,571

[45] Sep. 28, 1982

[54] DUAL-CIRCUIT PRESSURE CONTROL VALVES FOR BRAKE SYSTEMS

[75] Inventor: Bernd Schopper, Frankfurt am Main, Fed. Rep. of Germany

[73] Assignee: ITT Industries, Inc., New York, N.Y.

[21] Appl. No.: 174,339

[22] Filed: Aug. 1, 1980

[30] Foreign Application Priority Data

Sep. 20, 1979 [DE] Fed. Rep. of Germany ....... 2938104

[51] Int. Cl.$^3$ .................... B60T 17/18; B60T 11/08
[52] U.S. Cl. .................................. 303/40; 303/52; 303/84 R
[58] Field of Search ................. 251/242–244, 251/20; 303/40, 52, 54, 56, 84 A, 84 R

[56] References Cited

U.S. PATENT DOCUMENTS

| | | | |
|---|---|---|---|
| 3,227,494 | 1/1966 | Alfieri | 303/52 X |
| 3,758,168 | 9/1973 | Parsons | 303/52 |
| 4,184,717 | 1/1980 | Margetts | 303/52 |

*Primary Examiner*—Duane A. Reger
*Attorney, Agent, or Firm*—John T. O'Halloran; Alfred C. Hill

[57] ABSTRACT

With a known brake pressure control valve for a dual-circuit brake system, a tilting lever device is provided for the distribution of the preloading force on the control pistons, which increases the change-over point of the brake circuit in operation when the other brake circuit fails. This tilting lever device is complicated in construction and assembly and is not safe in its operation. Therefore, in accordance with the present invention the device for distributing the preloading force comprises two tops each of which is fixed to a different one of the two control pistons. The tops have supporting surfaces on which the preloading device abuts. The adjacent areas of the tops are meshed in such a way that the supporting surfaces of each top extend beyond the median plane located between the control pistons.

17 Claims, 4 Drawing Figures

DUAL-CIRCUIT PRESSURE CONTROL VALVES FOR BRAKE SYSTEMS

BACKGROUND OF THE INVENTION

This invention relates to a dual-circuit pressure control valve for brake systems including two control pistons arranged in parallel side by side and each assigned to a different brake circuit, and a common unguided preloading device, for instance, with a helical spring acting on the pistons through a distribution device, pressing each of the pistons at rest against a stop, which in the event of a pressure failure in one brake circuit increases the preload on the control piston of the other brake circuit.

In a known dual-circuit pressure control valve of this type, such as shown in FIGS. 5 to 7 of German Patent DE-OS No. 27 48 699, the distribution device includes a mushroom-like part, which projects with its stem into the somewhat larger blind bore between the control pistons, abuts with the bottom of the head on the end surfaces of the control pistons and is loaded directly by a helical spring on the top of its head. The stem is somewhat thickened at the lower end, so that it is guided in the blind bore. Each of the control pistons is a component of a different pressure control valve, each of which is inserted in a different one of two independent brake circuits, each leading from a different outlet pressure chamber of a tandem master cylinder, or an equivalent pressure generator, to a different one of the rear axle wheel brake cylinders of a cross-connected dual brake system. The control function can be different. The control valves can, for example, operate as a stop valve, which keeps the outlet pressure constant with rising inlet pressure after attainment of the change-over point, or as a pressure reducing valve, which makes the outlet pressure increase slower upon rising inlet pressure after the change-over point has been reached.

Such a distribution device sees to it that in normal operation half of the pressure of the helical spring is effective on each control piston and that both pressure control valves have the same change-over point. To accomplish this the stem of the mushroom shifts axially in the blind bore. If, however, one brake circuit fails, the whole pressure of the spring acts on the control piston of the other brake circuit, resulting in the change-over point there being increased to double the value and a correspondingly higher brake effect being achieved in the pertinent wheel cylinder. This is, however, possible only to an imperfect degree. As long as the mushroom head is tilted, only half of the force of the spring is acting on the control piston still in operation. Only in the event that the tilting movement is limited by abutment of the stem on both sides of the blind bore will the total force of the spring be in a position to act on the operating control piston when the mushroom head is shifted axially. This axial shift, however, takes place only after overcoming considerable sliding forces, so that no specific power ratio can be given for the determination of the change-over point. Additionally, the tilting angle of the mushroom head cannot be kept very small due to the comparatively short stem, whereupon the distance to be covered by the control piston with only half the spring load is a long one. A further disadvantage is that due to the arrangement of the blind bore between the two control pistons, a predetermined and desired housing width cannot be maintained.

It is furthermore common to use a guided preloading device, such as disclosed in FIGS. 1 to 4 and 8 of German Patent DE-OS No. 27 48 699. For this purpose a cup-shaped element is provided, which is loaded by a helical spring. The cup-shaped element is guided in the housing by its circumferential surface, has a mechanism to prevent twisting thereof and has a means for supporting a distribution lever on its bottom. The adjacent ends of the two control pistons are in contact with the ends of the distribution lever under normal operating conditions. If one brake circuit fails, the control piston of the other brake circuit can be operatively connected, after a short movement, with the bottom surface of the cup-shaped element, thus, having the whole spring force acting on it. Such a preloading device, however, entails considerable cost and material. Also, the preloading device is to a great extent loaded eccentrically under emergency operation conditions and, therefore, will also be subject to certain sliding forces.

SUMMARY OF THE INVENTION

An object of the present invention is to provide a dual-circuit pressure control valve of the aforementioned type, which renders it possible, thanks to a simple construction and a safe mode of operation, to load the control piston still operating upon failure of one brake circuit after a very short movement and without canting the preloading device, or the distribution device with the total force of the preloading device.

A feature of the present invention is the provision of a dual-circuit pressure control valve for a dual-circuit brake system comprising: two control pistons disposed in a housing in a parallel side by side relationship, each of the two pistons being associated with a different one of the brake circuits; and a common unguided preloading device acting on the two pistons through a distribution device and pressing the two pistons against a stop in their rest condition, the distribution device, in the event of a pressure failure in one of the brake circuits, increases the preload on the piston of the other of the brake circuits, the distribution device including two tops each fastened to an adjacent end of a different one of the two pistons, each of the two tops having a supporting surface disposed coaxial of a longitudinal axis of an associated one of the two pistons abutting the preloading device and at least one additional supporting surface disposed in a slightly spaced relationship with the preloading device, the additional supporting surfaces extending beyond a first median plane disposed between the two pistons.

In this arrangement the preloading device acts on both supporting surfaces under normal operating conditions, thus, half of the preload force is transferred to each of the two control pistons. In the event of failure of one brake circuit, the control piston still operating will then be displaced such that the additional supporting surface will also come in contact with the preloading device after a very short passage, so that the distribution device will lift totally from the supporting surface of the control piston not operating. Now the total force of the preloading device is acting on the control piston still in operation. Canting will not occur at the preloading device, or at the distribution device. Admittedly the control piston is loaded eccentrically under emergency operating conditions. However, what does not result is an interference due to a canting. In the first place, the two control pistons can be arranged relatively close to each other with the blind bore being omitted, so that not only the width of the housing, but also the mentioned eccentricity and, thus, the tilting moment are kept in limits. In the second place, pressure control valves are normally guided at two positions in the cylinder bore, axially remote from each other, so that the transverse forces counteracting the tilting moment are small.

The additional supporting surfaces are advantageously arranged symmetrically to the median plane passing through the supporting surfaces. This results in an even load under emergency operating conditions.

It is furthermore advantageous to have the arms of both tops meshed in a way which prevents a twisting of the tops. Under these circumstances, no further measures have to be taken in order to maintain the positions of the tops continuously.

In one preferred embodiment the first top accommodates two bifurcated arms and the second top has one arm disposed therebetween. The preloading device is a spring retainer which is loaded by a helical spring. After being assembled the tops maintain their symmetrical position with the median plane which passes through the supporting surfaces. Under emergency operating conditions the spring retainer is lifted from the supporting surface of the control piston still in operation and needs to tilt only slightly until it abuts the additional supporting surfaces. The helical spring has no difficulties in absorbing this tilting movement.

In another embodiment the additional supporting surfaces are arranged on the same circle as the supporting surfaces. From this results a three-point abutment for both tops under emergency operating conditions. Using a spring whose bottom coil coincides with the mentioned circle, the spring retainer can be eliminated. This leads to a very simple construction. It is advisable in this arrangement to have the tops provided with a spring guidance within the circle, which extends over the supporting surfaces.

Moreover, there may be an even inclination from the supporting surfaces to the additional supporting surfaces at the arms' ends. This ensures a continuous abutment of the preloading device on the top of the control piston still in operation under emergency operating conditions.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
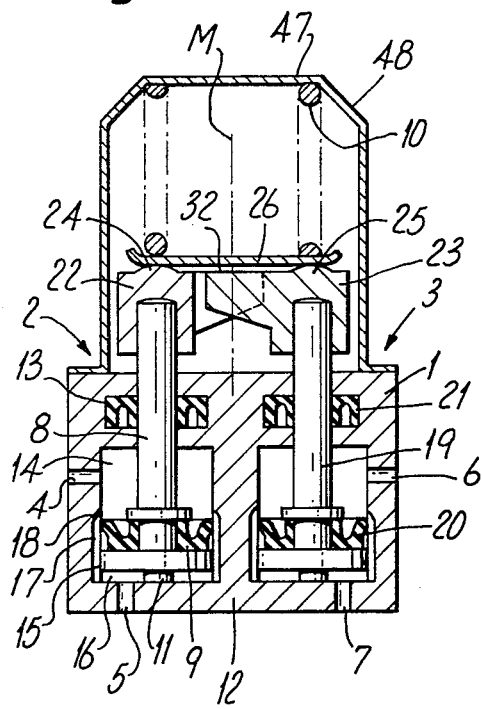
FIG. 1 is a longitudinal cross sectional view of a first embodiment of a dual-circuit pressure control valve in accordance with the principles of the present invention.

Referring to FIG. 1, the dual-circuit pressure control valve includes a housing 1 having two pressure control valves 2 and 3 disposed therein, each controlling the pressure in a different one of two brake circuits. Pressure control valve 2 is provided with an inlet 4 and an outlet 5, and pressure control valve 3 with an inlet 6 and an outlet 7. The inlets 4 and 6 are, for instance, each connected with a different one of the two outlet pressure chambers of a tandem master cylinder operated by a brake pedal, whereas the outlets 5 and 7 lead to a different one of the two rear wheel cylinders of an automotive vehicle.

Pressure control valve 2 houses a control piston 8 which has a sealing cup 9 and is pressed downwards with a certain preload by a helical spring 10 jointly operating on both pressure control valves 2 and 3. At rest the lower front surface 11 of piston 8 moves into abutment with the housing bottom 12. Control piston 8 is sealed from the outside by a seal 13. At rest inlet chamber 14 is connected with outlet chamber 16 through paraxial grooves 15 as illustrated. If, however, control piston 8 is moved upwards due to rising pressure and its differing pressure surfaces, and in doing so rim 17 of sealing cup 9 overrides the end of grooves 15 inlet chamber 14 and outlet chamber 16 are separated from each other so that with the inlet pressure continuing to rise the outlet pressure increases slower proportional to the ratio of the piston's pressure surfaces.

Likewise pressure control valve 3 incorporates a control piston 19 with a sealing cup 20. It is also sealed from the outside by a seal 21.

Figure 2:
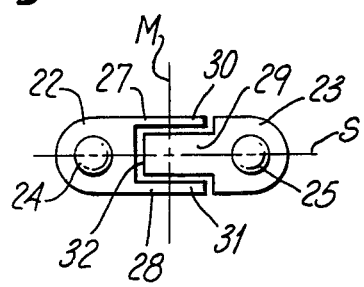
FIG. 2 is a top view of the tops of FIG. 1.

To the outer end of control piston 8 is fastened a top 22 and to the outer end of control piston 19 is fastened a top 23. Each of tops 22 and 23 has a supporting surface 24 and 25, respectively, in the shape of a spherical segment disposed coaxial of the longitudinal axis of the associated one of pistons 8 and 19. A spring retainer 26 loaded by helical spring 10 abuts surfaces 24 and 25. The other end of spring 10 bears against the inner surface 47 of a top 48, which is fastened to housing 1. As shown in FIG. 2 top 22 has two bifurcated arms 27 and 28 while top 23 has one single arm 29 disposed between arms 27 and 28. Arms 27, 28 and 29 extend in each case beyond the median plane M disposed between the two control pistons 8 and 19. Arms 27 and 28 have additional supporting surfaces 30 and 31, respectively, at their ends and arm 29 has an additional supporting surface 32 at its end. Arms 27–29 are arranged symmetrically to the median plane S passing through both supporting surfaces 24 and 25.

Under normal operating conditions preload P of the helical spring 10 acts evenly on both control pistons 8 and 19 through supporting surfaces 24 and 25. Therefore, each of the control pistons 8 and 19 are loaded with P/2.

On the other hand, if the brake circuit pertaining to pressure control valve 2 fails, control piston 8 remains in its rest position as illustrated. Only control piston 19 is moving upwards. After a short moment the additional supporting surface 32 will come in contact with spring retainer 26. Since retainer 26 is bearing on both sides of median plane M on top 23, retainer 26 lifts from supporting surface 24. As a result the total force P of spring 10 is acting on control piston 19. Because of this the change-over pressure point of the operative brake circuit is twice as high when compared with its normal operating condition. The braking effect in the remaining wheel cylinder is correspondingly high. The eccentric load on control piston 19 does not result in any canting, since the eccentricity is comparatively small and control piston 19 is guided in two positions axially remote from each other.

Figure 3:
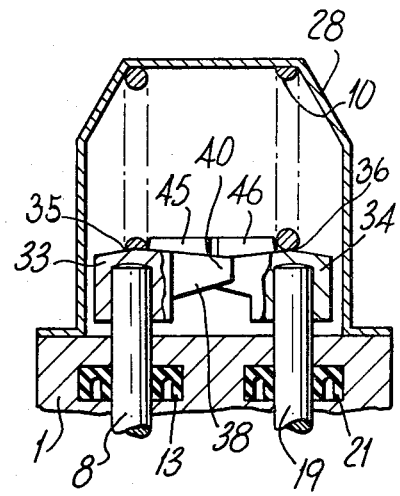
FIG. 3 is a longitudinal cross sectional view of the upper part of a second embodiment of a dual-circuit pressure control valve in accordance with the principles of the present invention.
Figure 4:
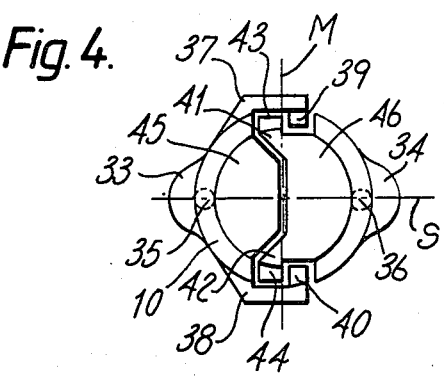
FIG. 4 is a top view of the tops of FIG. 3.

Regarding the embodiment of FIGS. 3 and 4 like parts have been given the same reference numerals as in FIGS. 1 and 2. The essential difference is that the tops 33 and 34 fixed to control pistons 8 and 19 enable eliminating spring retainer 26. For this purpose each of tops 33 and 34 is provided with a supporting surface 35 and 36, respectively. Top 33 has two arms 37 and 38, each having one additional supporting surface 39 and 40, respectively. Top 34 has two arms 41 and 42, each having one additional surface 43 and 44, respectively. The supporting surfaces 35 and 36 as well as the additional supporting surfaces 39, 40, 43 and 44 are placed on the same circle as the coils of helical spring 10. Also, tops 33 and 34 have within this circle a spring guidance 45 and 46, respectively, extending over the supporting surfaces. As in the embodiment of FIGS. 1 and 2, the additional supporting surfaces 39, 40, 43 and 44 extend beyond median plane M and are symmetrical on both sides of median plane S. Moreover, also in this embodiment arms 37, 38 and arms 41, 42 are meshed in such a manner that tops 33 and 34 are protected from twisting.

As in the embodiment of FIGS. 1 and 2, under normal operating conditions preload P of helical spring 10 acts evenly on both control pistons 8 and 19 through supporting surfaces 35 and 36. Therefore, each of the control pistons 8 and 19 are loaded with P/2. However, if, for instance, the brake circuit pertaining to pressure control valve 3 fails, piston 19 remains in its rest position and only control piston 8 moves upward. This causes an even inclination of spring 10 from supporting surface 35 to the additional supporting surfaces 39 and 40 of top 33 thereby enabling the bottom of coil 10 to bear on top 33 at three points of its circumferential length under emergency operating conditions and enables the total force P of spring 10 to act upon control piston 8.

This arrangement is equally suitable in pressure control valves with a limiting or some other pressure regulating function.

While I have described above the principles of my invention in connection with specific apparatus it is to be clearly understood that this description is made only by way of example and not as a limitation to the scope of my invention as set forth in the objects thereof and in the accompanying claims.

I claim:

1. A dual-circuit pressure control valve for a dual-circuit brake system comprising:
   two control pistons disposed in a housing in a parallel side by side relationship, each of said two pistons being associated with a different one of said brake circuits; and
   a common unguided preloading device acting on said two pistons through a distribution device and pressing said two pistons against a stop in their rest condition, said distribution device, in the event of a pressure failure in one of said brake circuits, increases the preload on said piston of the other of said brake circuits, said distribution device including
      two tops each fastened to an adjacent end of a different one of said two pistons, each of said two tops having a supporting surface disposed coaxial of a longitudinal axis of an associated one of said two pistons abutting said preloading device and at least one additional supporting surface disposed in a slightly spaced relationship with said preloading device, said additional supporting surface extending beyond a first medial plane disposed between said two pistons.

2. A control valve according to claim 1, wherein each of said additional supporting surfaces are disposed symmetrically with respect to a second median plane passing through each of said supporting surfaces.

3. A control valve according to claims 1 or 2, wherein each of said two tops has at least one arm extending therefrom toward the other of said two tops and said arms carry adjacent the ends thereof an associated one of said additional supporting surfaces.

4. A control valve according to claim 3, wherein one of said two tops has two arms extending therefrom towards the other of said two tops and said other of said two tops has at least one arm extending therefrom towards said one of said two tops meshed with said two arms to prevent twisting of said two tops.

5. A control valve according to claim 3, wherein one of said two tops includes two bifurcated arms and the other of said two tops includes one arm disposed between said bifurcated arms, and said preloading device includes a spring retainer loaded by a helical spring.

6. A control valve according to claim 5, wherein there is an even inclination from said supporting surface of each of said two tops to said additional supporting surfaces thereof.

7. A control valve according to claim 3, wherein one of said two tops includes a first pair of arms extending therefrom having an additional supporting surface on the end of each of said first pair of arms and the other of said two tops includes a second pair of arms extending therefrom having an additional supporting surface on the end of each of said second pair of arms, said first and second pair of arms being configured adjacent the ends thereof to cause each of said first pair of arms to be meshed with an associated one of said second pair of arms.

8. A control valve according to claim 7, wherein said additional supporting surfaces are disposed on the same circle as said supporting surfaces.

9. A control valve according to claim 8, wherein said preloading device is a helical spring having a turn thereof abut said two tops on said circle.

10. A control valve according to claim 9, wherein said two tops have a spring guide for said helical spring within said circle extending over said supporting surfaces.

11. A control valve according to claim 10, wherein there is an even inclination from said supporting surface of each of said two tops to said additional supporting surfaces thereof.

12. A control valve according to claim 1, wherein one of said two tops has two arms extending therefrom towards the other of said two tops and said other of said two tops has at least one arm extending therefrom towards said one of said two tops meshed with said two arms to prevent twisting of said two tops.

13. A control valve according to claim 1, wherein one of said two tops includes two bifurcated arms and the other of said two tops includes one arm disposed between said bifurcated arms, and said preloading device includes a spring retainer loaded by a helical spring.

14. A control valve according to claim 1, wherein one of said two tops includes a first pair of arms extending therefrom having an additional supporting surface on the end of each of said first pair of arms and the other of said two tops includes a second pair of arms extending therefrom having an additional supporting surface on the end of each of said second pair of arms, said first and second pair of arms being configured adjacent the ends thereof to cause each of said first pair of arms to be meshed with an associated one of said second pair of arms.

15. A control valve according to claim 14, wherein said additional supporting surfaces are disposed on the same circle as said supporting surfaces.

16. A control valve according to claim 15, wherein said preloading device is a helical spring having a turn thereof abut said two tops on said circle.

17. A control valve according to claim 16, wherein said two tops have a spring guide for said helical spring within said circle extending over said supporting surfaces.

* * * * *